(12) United States Patent
Duvalsaint et al.

(10) Patent No.: US 8,732,716 B2
(45) Date of Patent: May 20, 2014

(54) VIRTUALIZATION ACROSS PHYSICAL PARTITIONS OF A MULTI-CORE PROCESSOR (MCP)

(75) Inventors: Karl J. Duvalsaint, Lagrangeville, NY (US); Harm P. Hofstee, Austin, TX (US); Daeik Kim, Beacon, NY (US); Moon J. Kim, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1175 days.

(21) Appl. No.: 12/241,429

(22) Filed: Sep. 30, 2008

(65) Prior Publication Data
US 2010/0082942 A1    Apr. 1, 2010

(51) Int. Cl.
*G06F 9/50* (2006.01)

(52) U.S. Cl.
USPC .............................................. 718/104; 718/1

(58) Field of Classification Search
USPC .................. 718/100, 1, 104; 713/300; 714/30
See application file for complete search history.

(56) References Cited

U.S. PATENT DOCUMENTS

| | | | |
|---|---|---|---|
| 5,721,883 A | 2/1998 | Katsuo et al. | |
| 6,215,898 B1 | 4/2001 | Woodfill et al. | |
| 6,404,902 B1 | 6/2002 | Takano et al. | |
| 6,456,737 B1 | 9/2002 | Woodfill et al. | |
| 6,553,401 B1* | 4/2003 | Carter et al. | 709/200 |
| 6,567,622 B2 | 5/2003 | Phillips | |
| 6,661,931 B1 | 12/2003 | Kawada | |
| 6,662,268 B1* | 12/2003 | McBrearty et al. | 711/114 |
| 6,744,931 B2 | 6/2004 | Komiya et al. | |
| 6,820,217 B2* | 11/2004 | Mock et al. | 714/15 |
| 6,829,378 B2 | 12/2004 | DiFilippo et al. | |
| 6,877,158 B1* | 4/2005 | Arndt | 718/104 |
| 6,922,783 B2 | 7/2005 | Knee et al. | |
| 7,028,196 B2* | 4/2006 | Soltis et al. | 713/300 |

(Continued)

FOREIGN PATENT DOCUMENTS

WO    2008012159 A1    1/2008

OTHER PUBLICATIONS

Gschwind, Michael, "The Cell Broadband Engine: Exploiting Multiple Levels of Parallelism in a Chip Multiprocessor", International Journal of Parallel Programming, Kluwer Academic Publisher—Plenum Publishers, NE, vol. 35, No. 3, pp. 233-262, Apr. 6, 2007.

(Continued)

*Primary Examiner* — Aimee Li
(74) *Attorney, Agent, or Firm* — William E. Schiesser; Keohane & D Alessandro, PLLC

(57) ABSTRACT

Among other things, the disclosure is applied to a generic microprocessor architecture with a set (e.g., one or more) of controlling/main processing elements (e.g., MPEs) and a set of groups of sub-processing elements (e.g., SPEs). Under this arrangement, MPEs and SPEs are organized in a way that a smaller number MPEs control the behavior of a group of SPEs using program code embodied as a set of virtualized control threads. The apparatus includes a MCP coupled to a power supply coupled with cores to provide a supply voltage to each core (or core group) and controlling-digital elements and multiple instances of sub-processing elements. In accordance with these features, virtualized control threads can traverse the physical boundaries of the MCP to control SPE(s) (e.g., logical partitions having one or more SPEs) in a different physical partition (e.g., different from the physical partition from which the virtualized control threads originated.

15 Claims, 2 Drawing Sheets

(56) References Cited

U.S. PATENT DOCUMENTS

| | | | |
|---|---|---|---|
| 7,080,267 B2 | 7/2006 | Gary et al. | |
| 7,095,882 B2 | 8/2006 | Akahori | |
| 7,102,777 B2 | 9/2006 | Haraguchi | |
| 7,142,725 B2 | 11/2006 | Komiya et al. | |
| 7,174,550 B2 * | 2/2007 | Brice et al. | 718/1 |
| 7,418,368 B2 | 8/2008 | Kim et al. | |
| 7,743,375 B2 * | 6/2010 | Goodman et al. | 718/1 |
| 7,849,347 B2 * | 12/2010 | Armstrong et al. | 713/500 |
| 7,911,971 B2 * | 3/2011 | Beichter et al. | 370/252 |
| 8,019,962 B2 * | 9/2011 | Armstrong et al. | 711/173 |
| 8,327,353 B2 * | 12/2012 | Traut | 718/1 |
| 2003/0105799 A1 * | 6/2003 | Khan et al. | 709/201 |
| 2005/0034002 A1 | 2/2005 | Flautner | |
| 2005/0044301 A1 * | 2/2005 | Vasilevsky et al. | 711/1 |
| 2005/0083338 A1 | 4/2005 | Yun et al. | |
| 2005/0263678 A1 | 12/2005 | Arakawa | |
| 2005/0283679 A1 * | 12/2005 | Heller et al. | 714/39 |
| 2005/0289365 A1 | 12/2005 | Bhandarkar | |
| 2006/0013473 A1 | 1/2006 | Woodfill et al. | |
| 2006/0020944 A1 * | 1/2006 | King et al. | 718/104 |
| 2006/0250514 A1 | 11/2006 | Inoue et al. | |
| 2006/0268357 A1 | 11/2006 | Vook et al. | |
| 2007/0050764 A1 * | 3/2007 | Traut | 718/1 |
| 2007/0159642 A1 | 7/2007 | Choi | |

OTHER PUBLICATIONS

International Search Report and the Written Opinion of the International Searching Authority for END080354, International Application No. PCT/EP2009/062557, mailed Jan. 25, 2010.

* cited by examiner

VIRTUALIZATION ACROSS PHYSICAL PARTITIONS OF A MULTI-CORE PROCESSOR (MCP)

CROSS-REFERENCE TO RELATED APPLICATIONS

The present invention is related in some aspects to co-pending and commonly owned application entitled Virtualization in a Multi-Core Processor (MCP), which was filed on Sep. 11, 2008, and assigned application Ser. No. 12/208,651, the entire contents of which are herein incorporated by reference. The present application is also related in some aspects to co-pending and commonly owned application entitled Delegated Virtualization in a Multi-Core Processor (MCP), which was filed on Sep. 30, 2008, and assigned application Ser. No. 12/241,332, the entire contents of which are herein incorporated by reference.

FIELD OF THE INVENTION

The present invention generally relates to logical partitioning in a (e.g., symmetric) multi-core processor (MCP). Specifically, the present invention allows virtualized control threads to traverse physical partitions in a MCP to control logical partitions of sub-processing elements (SPEs).

BACKGROUND OF THE INVENTION

Low utilization of Multi-Core Processors (MCPs) has been a major drawback of symmetric MCPs. Also, design inflexibility forces continuous leakage current in the unloaded and stand-by sub-elements, such as Sub-Processing Element (SPE), so that the power is wasted. For example, in a symmetric MCP, there can be a Main Processing Element (MPE) and 8 SPEs. In many cases, only a portion of SPEs are utilized and the overall MCP utilization is usually low. Such stand-by SPEs consume high levels of power and continuously leak. Typically, a MCP is used for the high performance digital processor scaling, but due to the complexity of the MCP design, the utilization and the efficiency of the software become challenging to optimize as the MCP dimension increases.

SUMMARY OF THE INVENTION

This disclosure describes an apparatus, computer architecture, method, operating system, compiler, and application program products for MPEs as well as virtualization across physical boundaries that define physical partitions in a symmetric MCP. Among other things, the disclosure is applied to a generic microprocessor architecture with a set (e.g., one or more) of controlling/main processing elements (e.g., MPEs) and a set of groups of sub-processing elements (e.g., SPEs). Under this arrangement, MPEs and SPEs are organized in a way that a smaller number MPEs control the behavior of a group of SPEs using program code embodied as a set of virtualized control threads. The apparatus includes a MCP coupled to a power supply coupled with cores to provide a supply voltage to each core (or core group) and controlling-digital elements and multiple instances of sub-processing elements. The MPC is partitioned physically to reduce hardware and compiler design complexity in regular formation, such as a MPE controls M*SPES, and there are N groups of MPE+M*SPEs in the MCP. As such, virtualized control threads can traverse the physical boundaries of the MCP to control SPE(s) (e.g., logical partitions having one or more SPEs) in a different physical partition (e.g., different from the physical partition from which the virtualized control thread originated.

A first aspect of the present invention provides a multi-core processor, comprising: a first physical partition comprising a first main processing element, and a first logical partition of sub processing elements; a second physical partition comprising a second main processing element; and a first virtualized control thread associating the second main processing element of the second physical partition with the sub-processing elements of first logical partition.

A second aspect of the present invention provides a multi-core processor, comprising: a first physical partition comprising a first main processing element, and a first group of sub processing elements; a second physical partition comprising a second main processing element and a second group of sub-processing elements; a logical partition comprising a third group sub-processing elements; and a virtualized control thread associating the second main processing element of the second physical partition with the first logical partition.

A third aspect of the present invention provides a processing method, comprising: associating a main processing element of a first physical partition with a logical partition comprising sub-processing elements using a virtualized control thread; and controlling the group of sub-processing elements using the virtualized control thread.

A fourth aspect of the present invention provides a method for deploying a processing system, comprising: providing a multi-core processor, comprising: a first physical partition comprising a first main processing element, and a first logical partition of sub processing elements; a second physical partition comprising a second main processing element; and a first virtualized control thread associating the second main processing element of the second physical partition with the sub-processing elements of first logical partition.

A fifth aspect of the present invention provides a computer-implemented business method, comprising: associating a main processing element of a first physical partition with a logical partition comprising sub-processing elements using a virtualized control thread; and controlling the group of sub-processing elements using the virtualized control thread.

BRIEF DESCRIPTION OF THE DRAWINGS

These and other features of this invention will be more readily understood from the following detailed description of the various aspects of the invention taken in conjunction with the accompanying drawings in which.

Figure 1:
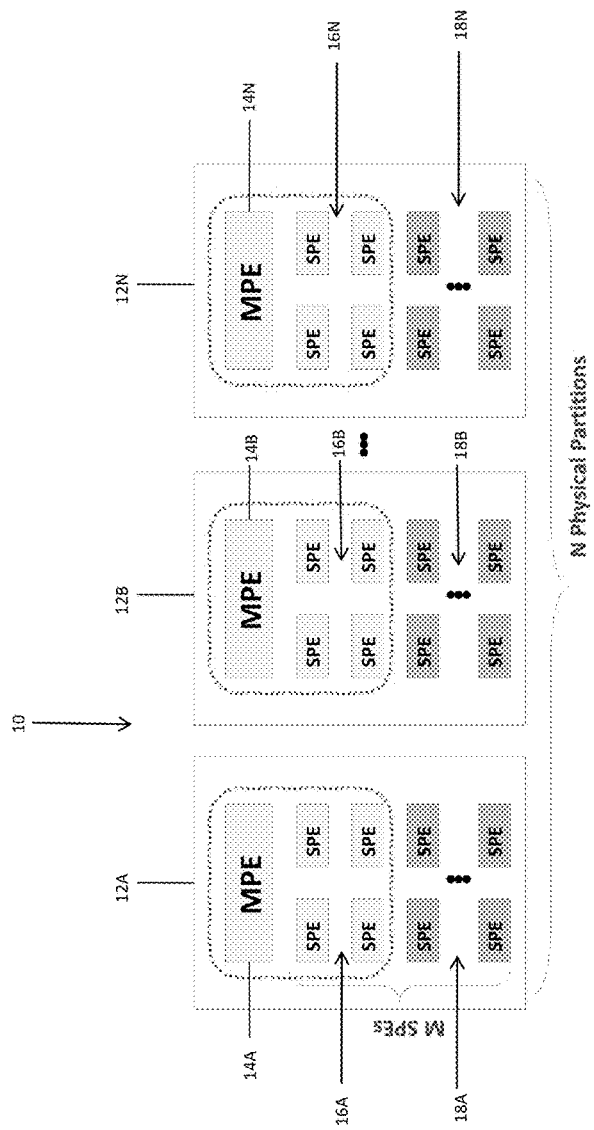
FIG. 1 shows a related art processor.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

This disclosure describes an apparatus, computer architecture, method, operating system, compiler, and application program products for MPEs as well as virtualization across physical boundaries that define physical partitions in a symmetric MCP. Among other things, the disclosure is applied to a generic microprocessor architecture with a set (e.g., one or more) of controlling/main processing elements (e.g., MPEs) and a set of groups of sub-processing elements (e.g., SPEs). Under this arrangement, MPEs and SPEs are organized in a way that a smaller number MPEs control the behavior of a group of SPEs using program code embodied as a set of virtualized control threads. The apparatus includes a MCP coupled to a power supply coupled with cores to provide a supply voltage to each core (or core group) and controlling-digital elements and multiple instances of sub-processing elements. The MPC is partitioned physically to reduce hardware and compiler design complexity in regular formation, such as a MPE controls M*SPES, and there are N groups of MPE+M*SPEs in the MCP. As such, virtualized control threads can traverse the physical boundaries of the MCP to control SPE(s) (e.g., logical partitions having one or more SPEs) in a different physical partition (e.g., different from the physical partition from which the virtualized control thread originated.

A conventional design uses each MPE (VMPE,1~VMPE, n) that controls portions of SPEs as a group (GSPE,1~GSPE, n). The MPE activity is interpreted as a virtualization VMPE, n, and the assigned SPEs are considered as the first group GSPE,n in each partition. By adopting the above method, it allows the following:

A MPE virtualizes (V) a thread;
Free SPEs across the physical partitions are accounted;
Requested SPEs are assigned to the $V_k$; and/or
$V_k$ controls SPEs within logical partition.

Under related art systems, such as that shown in FIG. 1, the MCP 10 can have multiple physical partitions 12A-N. Each partition 12A-N is shown having an MPE 14A-N, a group of SPEs 16A-N controlled by a respective MPE 14A-N. Each partition 12A-N also has reserve or stand-by SPEs 18A-N that remain unutilized. As only a portion of SPEs are utilized, the overall MCP utilization is usually low. Moreover, stand-by SPEs 18A-N consume high levels of power and continuously leak. Typically, a MCP is used for the high performance digital processor scaling, but due to the complexity of the MCP design, the utilization and the efficiency of the software become challenging to optimize as the MCP dimension increases.

Figure 2:
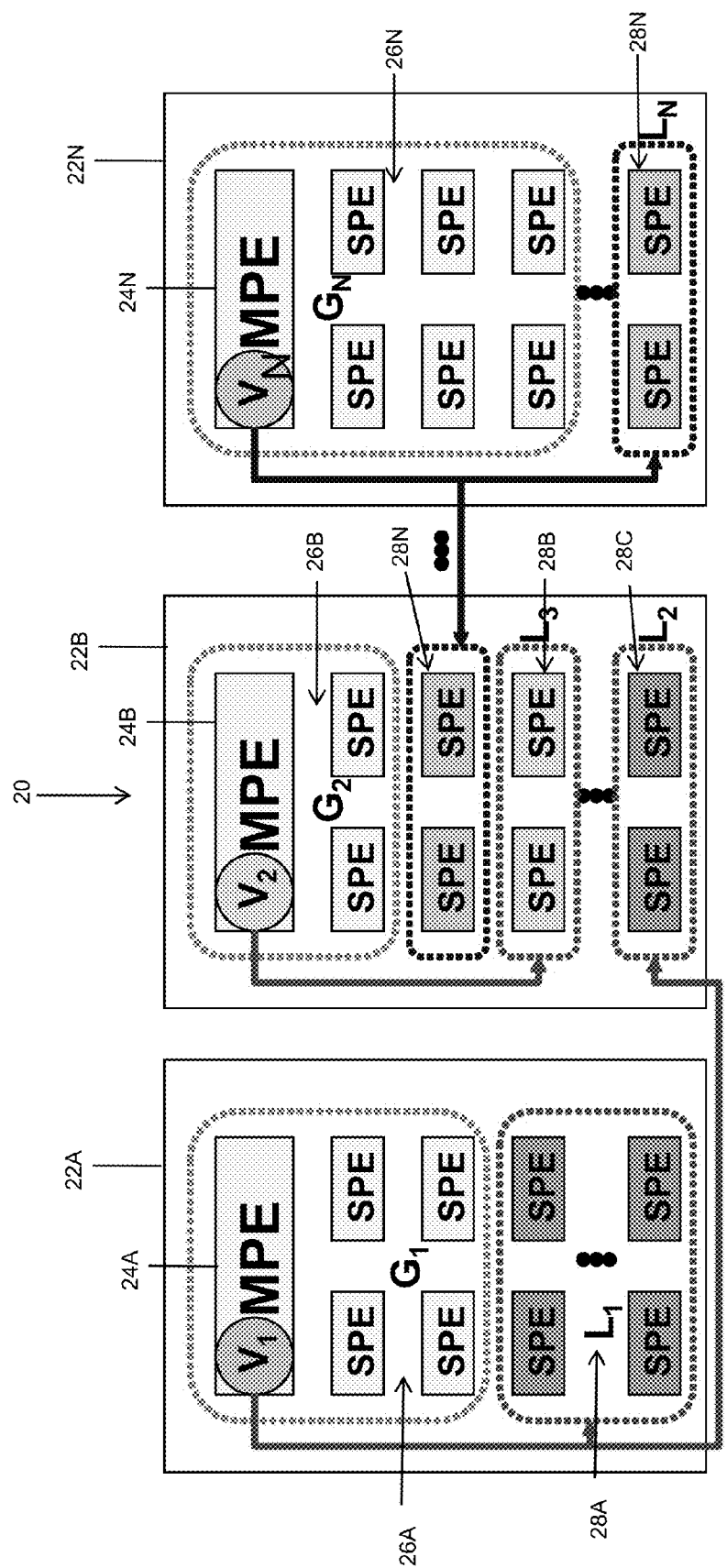
FIG. 2 shows multi-core processor according to the present invention.

To address these issues, a configuration such as that shown in FIG. 2 is provided. As depicted, MCP 20 comprises multiple physical partitions 22A-N. Each partition 22A-N is shown having an MPE 24A-N, a group G1-N of SPEs 26A-N controlled by a respective MPE 14A-N. It should be understood that a single MPE and a single group of SPEs is shown in each physical partition 22A-N for illustrative purposes only and that each physical partition 22A-N could actually have multiple MPEs as well as multiple groups of SPEs. Regardless, FIG. 2 further shows logical groups L1-N of SPEs 28A-N. Such logical groups can contain SPEs from a single physical partition such as L1, or SPEs from multiple physical partitions such as LN, which includes SPEs 28N from physical partitions 22B and 22N. Thus, the present invention allows logical groups of SPEs to transcend/traverse the physical barriers that define physical partitions.

In additional, virtualized control threads V1-VN will be generated by and/or embodied within MPEs 24A-N. Such threads V1-VN will control groups G1-GN of SPEs 26A-N and/or logical groups L1-LN of SPEs 28A-N. Along these lines, virtualized control threads can work within its own physical partition such as V2 is shown doing, or they can transcend/traverse the physical barriers of physical partitions such as V1 and VN are shown doing. In FIG. 2, virtualized control thread V1 controls logical groups L1 and L2, virtualized control thread V2 controls logical group L3, while virtualized control thread VN controls logical group LN. Any of these virtualized control thread V1-VN could also control any of groups G1-GN, within their own physical partitions or by traversing physical partitions.

In controlling groups of logical partitions of SPEs, virtualized control threads can perform many functions. These include, but are not limited to: the virtualized control threads being configured to send program code and data to the sub-processing elements; the virtualized control thread being further configured to collect computation results from the sub-processing elements; the virtualized control threads controlling a clock speed, power consumption and computation loading of the sub-processing elements. Regardless, MPEs 24A-N can log all events, information exchanges, controls, etc., taking place. These and other details are further shown below:

All log(s) are stored and made accessible to all MPEs. The computation-loaded SPEs and unloaded/free SPEs are accounted with the log. The virtualization is initiated by either software or hardware request. An Operating System (OS) is designed to enable multiple independent threads with virtualization. Computer programming languages and the machine code compilers support the virtualization with libraries. Upon request, the MPEs will request a number of SPEs (out of the free/unused SPEs) to form a group (GN). The group efficiency is optimized by maximizing the bus allocation and connectivity. The MPE runs all the virtualization V0 . . . VN with time-division resource sharing and OS-level preemptive task management allows multi-tasking and virtualization. If the requested number of SPEs are greater than the available free SPEs in the MPE's physical partition, the nearest free SPEs in the nearby physical partitions are summoned to join the logical group. A group of SPEs (G) is assigned to the virtualized control thread (V). The MPE maintains different virtualized control threads over the SPEs, as shown in the diagram. The virtualization thread V loads executable program codes and data to the SPE group G, and monitors the progress and controls the performance and power consumption of G. When the G produces computation results, the V mitigates the results to the MPE, allowing further computations or external I/O.

The number of total virtualized control threads is limited by the MPE capacity to hold virtualization, and the number of available SPEs. Further requests for virtualization can be denied, or accepted by sharing time-division thread sharing. The virtualized control threads (V) in the MPEs control the power supply voltage and clock frequency to each SPE group (Gk), so that the active and stand-by currents are optimized for the required computations. Usually a digital circuit speed increases when the supply voltage is raised, and the clock speed can be increased. Within the allowed supply voltage range, it is adjusted based on the computation requirements.

When the loaded computation requires intensive operation, the voltage and clock frequency are raised so that it is completed within the time frame. When the loaded computation is loose and if there is plenty of time for processing, the voltage and the clock frequency are lowered to maximize performance/power ratio. An extreme case is when SPEs are standing by. The supply voltage can be reduced to 0 voltage to put the SPE is sleep mode. Slightly higher voltages can be used with a trade-off between leakage current and wake up time. It takes more time to wake an element when it is in a deeper sleep mode. Among others, some benefits of this approach are: (1) the MCP utilization and computation capacity is maximized and (2) the power efficiency of the MCP is optimized. Overall, the MCP improves performance/power ratio to enable greener computing.

It should be understood that the present invention could be deployed on one or more computing devices (e.g., servers, clients, etc.) within a computer infrastructure. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, the computer infrastructure is intended to demonstrate that some or all of the components of such an implementation could be deployed, managed, serviced, etc., by a service provider who offers to implement, deploy, and/or perform the functions of the present invention for others.

Where computer hardware is provided, it is understood that any computers utilized will include standard elements such as a processing unit, a memory medium, a bus, and input/output (I/O) interfaces. Further, such computer systems can be in communication with external I/O devices/resources. In general, processing units execute computer program code, such as the functionality described above (e.g., all libraries discussed herein), which is stored within memory medium(s). While executing computer program code, the processing unit can read and/or write data to/from memory, I/O interfaces, etc. The bus provides a communication link between each of the components in a computer. External devices can comprise any device (e.g., keyboard, pointing device, display, etc.) that enable a user to interact with the computer system and/or any devices (e.g., network card, modem, etc.) that enable the computer to communicate with one or more other computing devices.

The hardware used to implement the present invention can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, the processing unit therein may comprise a single processing unit, or be distributed across one or more processing units in one or more locations, e.g., on a client and server. Similarly, the memory medium can comprise any combination of various types of data storage and/or transmission media that reside at one or more physical locations. Further, the I/O interfaces can comprise any system for exchanging information with one or more external device. Still further, it is understood that one or more additional components (e.g., system software, math co-processing unit, etc.) can be included in the hardware.

While shown and described herein as virtualization in a multi-core processor, it is understood that the invention further provides various alternative embodiments. For example, in one embodiment, the invention provides a computer-readable/useable medium that includes computer program code to enable a computer infrastructure to provide visualization in a multi-core processor. To this extent, the computer-readable/useable medium includes program code that implements the process(es) of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a method (e.g., business) that performs the process of the invention on a subscription, advertising, and/or fee basis. That is, a service provider, such as a Solution Integrator, could offer to provide virtualization in a multi-core processor. In this case, the service provider can create, maintain, support, etc., a computer infrastructure, such as computer infrastructure that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a processing method. In this case, a computer infrastructure can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or I/O devices (including, but not limited to, keyboards, displays, pointing devices, etc.) can be coupled to the system either directly or through intervening I/O controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A multi-core processor, comprising:
   a set of main processing elements, each configured to generate virtualized control threads to control sub processing elements, the set of main processing elements comprising:
      a first main processing element located in a first physical partition, second main processing element located in a second physical partition, and
      a third main processing element located in a third physical partition;
   a logical group of sub-processing elements, wherein a first sub-processing element is located in the first physical partition, a second sub-processing element is located in the second physical partition, and a third sub-processing element is located in the third physical partition; and
   a first virtualized control thread generated by the first main processing element, the first virtualized control thread associating the second main processing element of the second physical partition with the logical group of sub-processing elements, wherein the first virtualized control thread is configured to:
      control a clock speed, power consumption and computation loading of sub-processing elements of the logical group of sub-processing elements,
      collect computation results from the sub-processing elements of the logical group of sub-processing elements, and
      send program code and data to the sub-processing elements of the logical group of sub-processing elements.

2. The multi-core processor of claim 1, further comprising a second virtualized control thread generated by the second main processing unit, the second virtualized control thread associating the second main processing element with a group of sub-processing elements.

3. The multi-core processor of claim 2, the group of sub-processing elements being in the second physical partition.

4. The multi-core processor of claim 2, the group of sub-processing elements being in the third physical partition.

5. The multi-core processor of claim 1, a first logical partition comprising all sub-processing elements in the first physical partition.

6. The multi-core processor of claim 1, a first logical partition comprising only a subset of all sub-processing elements in the first physical partition.

7. A multi-core processor, comprising:
   a first physical partition comprising a first main processing element, and a first group of sub processing elements;
   a second physical partition comprising a second main processing element, and a second group of sub-processing elements;
   a third physical partition comprising a third main processing element, and a third group of sub-processing elements;
   a logical partition comprising the first group of sub-processing elements, the second group of sub-processing elements, and the third group of sub-processing elements; and
   a virtualized control thread generated by the first main processing element, the virtualized control thread associating the second main processing element of the second physical partition with the logical partition, wherein the virtualized control thread is configured to:
      control a clock speed, power consumption and computation loading of sub-processing elements of the logical partition,
      collect computation results from the sub-processing elements of the logical partition, and
      send program code and data to the sub-processing elements of the logical partition.

8. The multi-core processor of claim 7, the logical partition being in the first physical partition.

9. The multi-core processor of claim 7, the virtualized control thread extending across physical boundaries defined by the first physical partition and the second physical partition.

10. The multi-core processor of claim 7, the virtualized control thread being operable to control the third group of sub-processing elements in the logical partition.

11. A processing method, comprising:
   receiving a request, issued from a main processing element, for a number of sub-processing elements, the main processing element located within a first physical partition;
   determining that the requested number of sub-processing elements exceeds a number of free sub-processing elements within the first physical partition;
   locating at least two available sub-processing elements, at least one of the at least two available sub-processing elements located in a second physical partition, and at least one other of the at least two available sub-processing elements located in a third physical partition;
   joining free sub-processing elements of the first physical partition with the at least two available sub-processing elements into a logical partition;
   associating the main processing element with the logical partition, a virtualized control thread being generated by the main processing element; and
   controlling a group of sub-processing elements of the logical partition using the virtualized control thread, wherein the controlling comprises:
      controlling a clock speed, power consumption and computation loading of the sub-processing elements of the logical partition,
      collecting computation results from the sub-processing elements of the logical partition, and
      sending program code and data to the sub-processing elements of the logical partition.

12. The processing method of claim 11, the virtualized control thread being in the first physical partition, and the logical partition being in the first physical partition.

13. The processing method of claim 12, the virtualized control thread being in the second physical partition, and the logical partition being in the first physical partition.

14. The processing method of claim 12, the virtualized control thread being in the first physical partition and the logical partition being in the second physical partition.

15. A method for deploying a processing system, comprising:
   providing a multi-core processor, comprising:
      a set of main processing elements, each configured to generate virtualized control threads to control sub-processing elements, the set of main processing elements comprising:

a first main processing element located in a first physical partition,
a second main processing element located in a second physical partition, and
a third main processing element located in a third physical partition;
a logical group of sub-processing elements, wherein a first sub-processing element is located in the first physical partition, a second sub-processing element is located in the second physical partition, and a third sub-processing element is located in the third physical partition; and
a first virtualized control thread generated by the first main processing element, the first virtualized control thread associating the second main processing element of the second physical partition with the logical group of sub-processing elements, wherein the first virtualized control thread is configured to:
control a clock speed, power consumption and computation loading of sub-processing elements of the logical group of sub-processing elements,
collect computation results from the sub-processing elements of the logical group of sub-processing elements, and
send program code and data to the sub-processing elements of the logical group of sub-processing elements.

* * * * *